J. R. LONG.
PIPE REAMING MACHINE.
APPLICATION FILED DEC. 18, 1911.
1,038,914.
Patented Sept. 17, 1912.
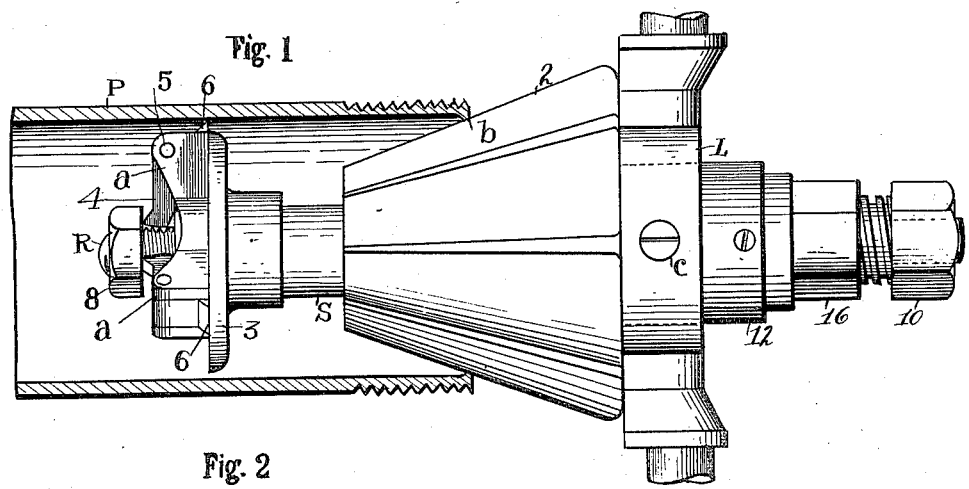
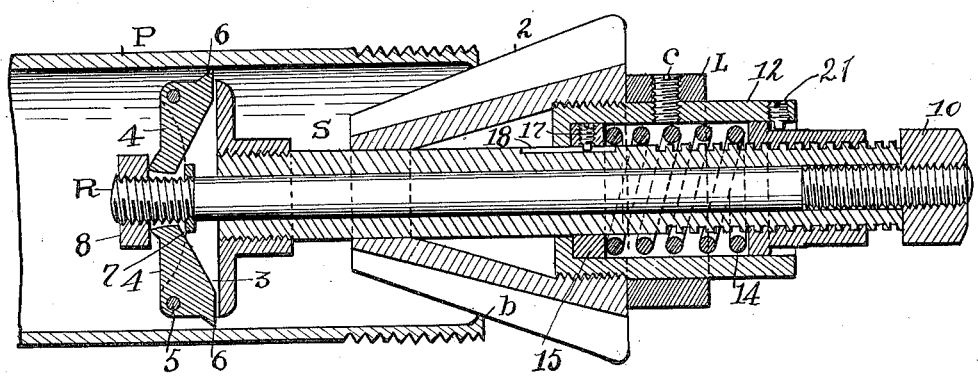
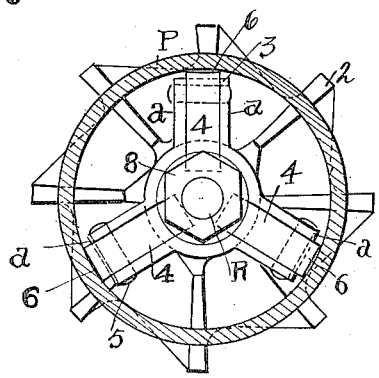
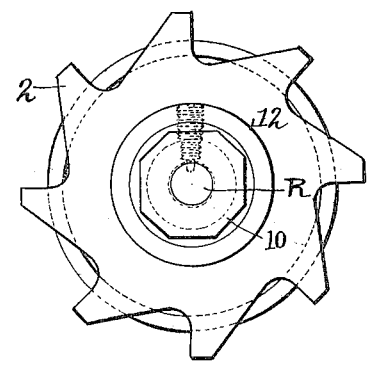
ATTEST
E. M. Fisher
J. C. Mussun
INVENTOR
John R. Long.
By Fisher & Moser, ATTYS.

UNITED STATES PATENT OFFICE.

JOHN R. LONG, OF EAST AKRON, OHIO.

PIPE-REAMING MACHINE.

1,038,914.　　　　　Specification of Letters Patent.　　Patented Sept. 17, 1912.

Application filed December 18, 1911. Serial No. 666,502.

*To all whom it may concern:*

Be it known that I, JOHN R. LONG, citizen of the United States, residing at East Akron, in the county of Summit and State of Ohio, have invented certain new and useful Improvements in Pipe-Reaming Machines, of which the following is a specification.

My invention relates to an improvement in pipe reaming machines, the same being constructed and adapted to operate substantially as shown and described and particularly pointed out in the claims.

In the accompanying drawings, Figure 1 is a plan view of the reamer and a sectional view lengthwise of a pipe into which the reamer is projected in a working relation, and Fig. 2 is a longitudinal sectional view of Fig. 1. Fig. 3 is an elevation looking in from the left of Fig. 1, and Fig. 4 is an elevation looking in from the right of Fig. 1.

Two objects are especially in view in this case, the first of which contemplates the fastening of the reaming tool on the inside of the pipe to be reamed, and the other an exclusive spring feed for the reaming head after working adjustment has been effected.

Repeating the first object, it may be observed that the present construction is particularly adapted to the larger sizes of pipes, and by going on the inside of the pipe rather than upon the outside I am enabled not only to effect a better working grip upon the pipe than formerly, but can also employ a much lighter mechanism, which is material because these reamers are used by plumbers on the job and often have to be carried back and forth on the person.

Now referring to the parts, 2 represents the reaming tool or reamer proper, and 3 the fastening or engaging head which enters the pipe P and fastens the parts in working relations. The reamer in itself as a device or tool is not broadly claimed herein, and is shown as slidably mounted on a tubular shaft S which also carries the head 3 as a removable and interchangeable member. That is, the said head is designed to be of a size corresponding to the size of the pipe to be reamed, larger or smaller. That is, the head shown is adapted substantially to the size of pipe shown, and if a pipe differing materially in size were to be reamed a head of a size corresponding thereto would be substituted for present head 3 and so on. These heads are comparatively small parts at the most, and several sizes can be carried without inconvenience. Each head has pairs of flanges $a$ on its face between which the dogs or jaws 4 are pivotally mounted in the outer angles at 5, and each dog has a chilled tooth or point 6 adapted to engage in the pipe P and make a firm fastening grip. The longer or inner end of the said jaws 4 constitute arms which engage between a collar 7 and a nut 8 on the end of an adjusting rod R and between which the said ends or arms are engaged in such manner that when the said rod is adjusted outward the said jaws will thrust their teeth 6 into pipe P and lock therein, and when adjusted in the opposite direction will release said jaws from their grip.

The rod R has to do exclusively with the operation of the jaws 4 and is slidable within limits in the tube S which carries head 3 and has an adjusting nut 10 on its outer end adapted to be engaged and rotated by means of a suitable wrench. Obviously, when said nut is tightened it will draw outwardly upon rod R and tend to tighten the jaws 4 in the pipe and the reverse of this movement will loosen said jaws as above indicated. On the other hand the reamer 2 is mounted at its reduced end directly upon the tube S, while at its larger or outer end or base it is threaded upon a thimble 12, which surrounds the said tube or shaft S and is sufficiently larger than the tube to afford room within the same for a spiral spring 14. The said spring is bodily inclosed by said thimble and in this instance bears against a collar 15 in the otherwise closed end of the thimble and is itself pressed upon by an adjusting and tightening sleeve nut 16 which is threaded onto shaft S and rotarily adapted to tighten said spring 14 in said thimble with as much tension as may be needed to place the reamer under exclusive spring domination to enforce its cutting action when once adjusted.

In operation the device is set endwise into the pipe as shown and the next thing is to fasten the device in the pipe. This is done by tightening the nut 10 on rod R which draws the jaws 4 into locking engagement with the pipe. Presumably the reaming tool 2 also is in position as seen in Fig. 2 and in cutting relation to the bur $b$ in the pipe. The nut 16 is then tightened to place the spring 14 under such tension as may be required to force the reamer into cutting action on bur *b* when the reamer is turned. Reaming is effected through a lever wrench, or its equivalent, sleeved over the thimble 12 and secured thereto by screws C. Obviously when reamer 2 is under tension of spring 14, rotation thereof will effect reaming of the bur *b*. Collar 15 has a screw 17 projected into a groove 18 in tube S to prevent rotative movement of the collar and the spring when thimble 12 is rotated.

The sleeve nut 16 which carries the outer end of the thimble 12 has an annular rim or flange 20 about its inner end and a set screw or stop 21 in the thimble engages behind the said flange and serves as a stop to the inward movement of the thimble under the action of the spring.

What I claim is:

1. A pipe reamer comprising a central tubular shaft and a reamer rotatably and slidably mounted thereon, a thimble carrying the rear portion of said tool on said shaft and means to rotate the same about said thimble, a sleeve nut threaded on said tube and extending within said thimble and having a flange about its inner portion, and a check screw through said thimble bearing against said flange and adapted to limit the inward movement of the said thimble and head, and a spring within the thimble to press the same forward.

2. A reaming device having a tubular shaft and a rod extending through both ends of said shaft, jaws operatively connected with the inner ends of said shaft and rod and adapted to lock both said parts in a pipe to be reamed, in combination with a reaming tool rotatably and slidably mounted on said tube, a spring to force said tool forward and means to rotate the tool.

3. A pipe reamer comprising a tube adapted to be projected into a pipe to be reamed and a reaming tool slidably and rotatably mounted thereon, a thimble threaded in the outer portion of said tool and slidably and rotatably supported with said tool, a spring within said thimble bearing axially against the same and adapted to force the tool forward when rotated to do the work and means to tighten said spring in said thimble, in combination with a rod through said tube, a head on the outer end of said tube and jaws pivoted thereon, and means on the outer end of said rod engaging said jaws and adapted to force them outward into locking position.

4. A pipe reamer having a tubular shaft and a rod through the same and jaws at the inner ends of said parts pivoted on said shaft and in actuating relations with said rod, in combination with a reaming tool slidable on said shaft and a thimble in the base of said tool slidably mounted on said shaft and a spring therein adapted to press the said tool forward into working position, a nut to tighten the said spring threaded on the said shaft within said thimble, and a nut on the end of said rod adapted to slide the rod axially and set the said jaws in engaging position.

In testimony whereof I affix my signature in presence of two witnesses.

JOHN R. LONG.

Witnesses:
R. B. MOSER,
F. C. MUSSUN.